(12) United States Patent
Liu et al.

(10) Patent No.: US 11,494,039 B1
(45) Date of Patent: Nov. 8, 2022

(54) TOUCH SENSOR

(71) Applicant: TPK Advanced Solutions Inc., Fujian (CN)

(72) Inventors: Shao Jie Liu, Xiamen (CN); Qin Xue Fang, Xiamen (CN); Xue Long Zhang, Yingshang County (CN); Mei Fang Lan, Xiamen (CN); Wei-Chia Fang, Hsinchu County (TW); En-Chia Chang, Taipei (TW); Xiao Ping Guo, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/315,472

(22) Filed: May 10, 2021

(51) Int. Cl.
*G06F 3/044* (2006.01)

(52) U.S. Cl.
CPC ................................. *G06F 3/0443* (2019.05)

(58) Field of Classification Search
None
See application file for complete search history.

(56) References Cited

U.S. PATENT DOCUMENTS

| | | | | |
|---|---|---|---|---|
| 2012/0227259 | A1* | 9/2012 | Badaye | G09G 3/3611 29/846 |
| 2014/0192027 | A1* | 7/2014 | Ksondzyk | G06F 3/0446 345/178 |
| 2014/0210784 | A1* | 7/2014 | Gourevitch | G06F 3/0443 345/174 |
| 2014/0216784 | A1* | 8/2014 | Wang | H05K 1/097 174/250 |
| 2014/0313169 | A1* | 10/2014 | Kravets | H03K 17/962 324/660 |
| 2016/0320876 | A1* | 11/2016 | Son | G06F 3/04164 |
| 2018/0239180 | A1* | 8/2018 | Ogasawara | G02F 1/1345 |

FOREIGN PATENT DOCUMENTS

| | | |
|---|---|---|
| CN | 111665971 A | 9/2020 |
| TW | 202044000 A | 12/2020 |
| TW | M606081 U | 1/2021 |

* cited by examiner

*Primary Examiner* — Parul H Gupta
(74) *Attorney, Agent, or Firm* — Cooper Legal Group, LLC

(57) ABSTRACT

A touch sensor having a visible area and a peripheral area at least on one side of the visible area includes a substrate, a touch electrode layer, and peripheral traces. The touch electrode layer is disposed on a surface of the substrate and includes touch electrodes corresponding to the visible area. The peripheral traces are disposed on the surface of the substrate and corresponding to the peripheral area. The peripheral traces are respectively electrically connected to the touch electrodes. Each of the peripheral traces includes a matrix and metal nanowires distributed in the matrix. A line width of each of the peripheral traces is more than or equal to 6 μm and less than or equal to 12 μm, and a line spacing of any adjacent peripheral traces of the peripheral traces is more than or equal to 6 μm and less than or equal to 12 μm.

20 Claims, 8 Drawing Sheets

TOUCH SENSOR

BACKGROUND

Field of Disclosure

The present disclosure relates to a touch sensor.

Description of Related Art

In recent years, touch sensors have been widely used in portable electronic products such as mobile phones, notebook computers, satellite navigation systems, and digital audio-visual players to serve as information communication channels between users and electronic devices.

As demand for narrow bezel electronic products gradually increases, the industry is committed to reducing the size of the bezel of touch panels to meet the needs of users. Generally, a touch panel includes touch electrodes and peripheral circuits, and the touch electrodes and the peripheral circuits are usually overlapped with each other in the peripheral area to form a conductive path or loop, such that the touch electrodes can transmit signals to external controllers through the peripheral circuits. The bezel size of the touch panel often depends on factors such as line width and line spacing of the peripheral circuits, the contact area between the touch electrodes and the peripheral circuits, etc., which further affect the stability of signal transmission. Therefore, how to provide a touch panel which can not only meet the requirements of narrow bezel design, but also meet the requirements of electrical specifications for the touch panel is currently worth studying.

SUMMARY

According to some embodiments of the present disclosure, a touch sensor having a visible area and a peripheral area at least on one side of the visible area includes a substrate, a touch electrode layer, and a plurality of peripheral traces. The touch electrode layer is disposed on a surface of the substrate and includes a plurality of touch electrodes corresponding to the visible area. The peripheral traces are disposed on the surface of the substrate and corresponding to the peripheral area. The peripheral traces are respectively electrically connected to the touch electrodes, in which each of the peripheral traces includes a matrix and a plurality of metal nanowires distributed in the matrix, a line width of each of the peripheral traces is more than or equal to 6 μm and less than or equal to 12 μm, and a line spacing of any adjacent peripheral traces of the peripheral traces is more than or equal to 6 μm and less than or equal to 12 μm.

In some embodiments of the present disclosure, the line width of each of the peripheral traces is less than or equal to 10 μm, preferably less than or equal to 8 μm, and the line spacing of any adjacent peripheral traces of the peripheral traces is less than or equal to 10 μm, preferably less than or equal to 8 μm.

In some embodiments of the present disclosure, a ratio of a width of the peripheral area on the one side of the visible area to a width of the visible area is between 0.003 and 0.010.

In some embodiments of the present disclosure, the touch electrode layer is a metal nanowire layer including the matrix and the metal nanowires distributed in the matrix.

In some embodiments of the present disclosure, each of the peripheral traces includes a first conductive layer and a second conductive layer disposed in a stack, and the first conductive layer is a metal nanowire layer including the matrix and the metal nanowires distributed in the matrix.

In some embodiments of the present disclosure, the first conductive layer between the second conductive layer and the substrate, and the first conductive layer contacts a lower surface of the second conductive layer.

In some embodiments of the present disclosure, the first conductive layer and the touch electrode layer are on a same horizontal plane.

In some embodiments of the present disclosure, the second conductive layer is between the first conductive layer and the substrate, and the second conductive layer contacts a lower surface of the first conductive layer.

In some embodiments of the present disclosure, the first conductive layer and the touch electrode layer are on different horizontal planes, and the first conductive layer is connected to one of the touch electrodes corresponding to the first conductive layer by a climbing section.

In some embodiments of the present disclosure, a sidewall of the first conductive layer is substantially aligned with a sidewall of the second conductive layer.

In some embodiments of the present disclosure, the first conductive layer of and one of the touch electrodes connected and corresponding to the first conductive layer are integrally formed as one piece without any interface therebetween.

In some embodiments of the present disclosure, the touch sensor further includes a film layer covering the peripheral traces.

In some embodiments of the present disclosure, the film layer is filled between the adjacent peripheral traces of the peripheral traces.

In some embodiments of the present disclosure, the first conductive layer and the second conductive layer of each of the peripheral traces are in contact with the film layer.

In some embodiments of the present disclosure, the second conductive layer is a single-layer structure made of a single metal material or an alloy material, a bilayer or multi-layer structure made of two or more metal materials or alloy materials, or a bilayer or multi-layer structure made of a metal material and a metal oxide material.

In some embodiments of the present disclosure, a covering structure is on an interface between the matrix and each of the metal nanowires of each of the peripheral traces.

In some embodiments of the present disclosure, the matrix is filled between adjacent metal nanowires of the metal nanowires, and the covering structure does not exist alone in the matrix.

In some embodiments of the present disclosure, the covering structure covers an entirety of the interface between the matrix and each of the metal nanowires so as to define a covering layer uniformly formed on the interface between the matrix and each of the metal nanowires.

In some embodiments of the present disclosure, the covering structure is a single-layer structure made of a single metal material or an alloy material, or a bilayer or multi-layer structure made of two or more metal materials or alloy materials.

According to the aforementioned embodiments of the present disclosure, the peripheral traces of the touch sensor of the present disclosure include metal nanowires, and a line width and a line spacing of the peripheral traces are each designed to be within a specific numerical range. Moreover, a variety of structures of the peripheral traces with a line width and line spacing within the specific numerical range that can be implemented are provided. As such, the touch sensor can provide a variety of applications that meet the requirements of electrical specifications of the touch sensor and narrow bezel design, thereby meeting the demand of the market. Furthermore, when the peripheral traces of the touch sensor are made of different materials, there will be different limitations due to different materials and the corresponding patterning process conditions. In other words, there is no comparison between the specification of the peripheral traces made of materials different from metal nanowires and the specification of the peripheral traces made of metal nanowires.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
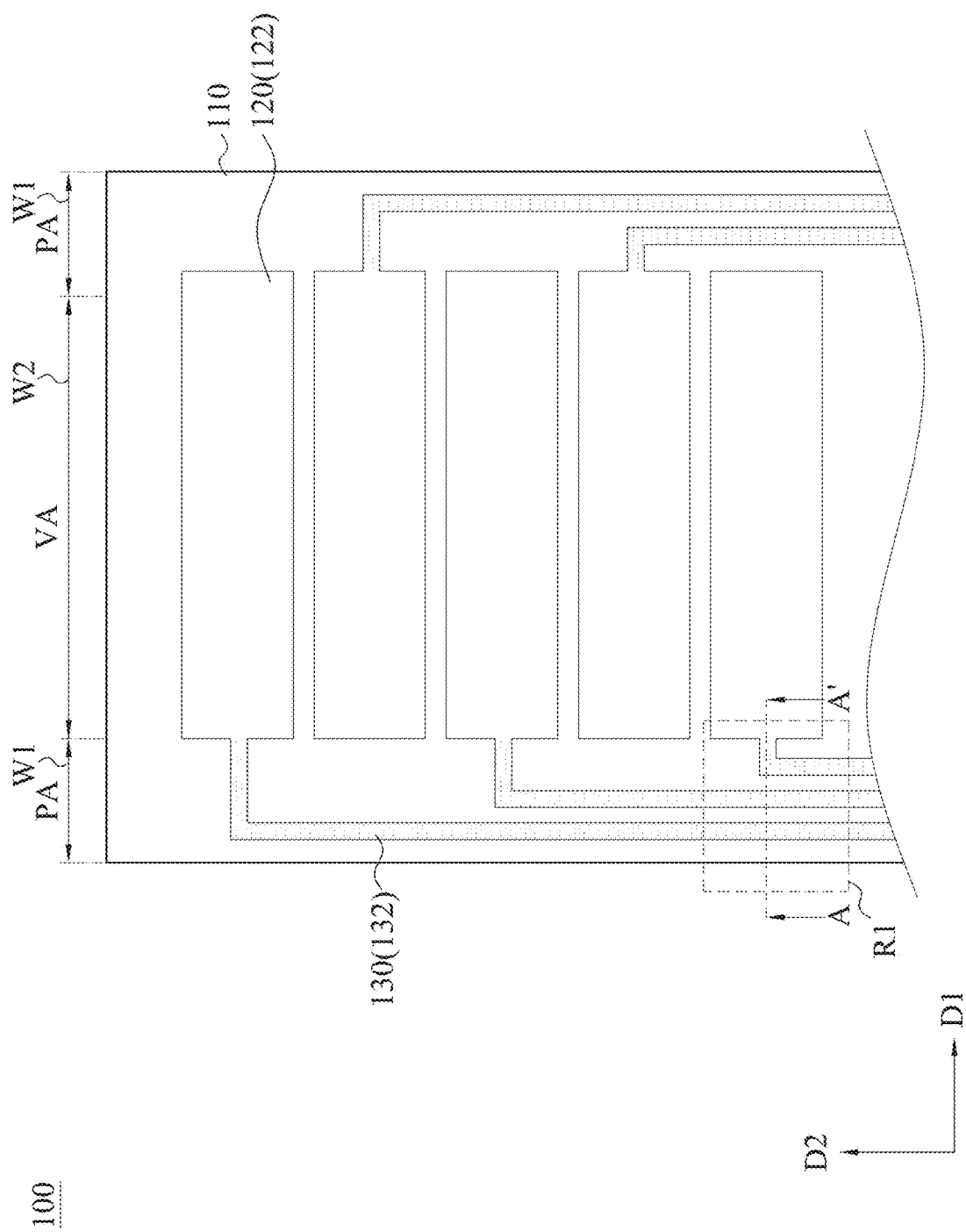
FIG. 1A is a schematic top view illustrating a touch sensor according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It should be understood that relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

In addition, terms such as "about", "approximately", or "substantially" used in the present disclosure generally refer to "within 20 percent, preferably within 10 percent, or more preferably within 5 percent of a given value or range". When not expressly stated, the values or ranges mentioned in the present disclosure are regarded as approximate values or ranges. That is, the terms "about", "approximately", or "substantially" can be inferred if not expressly stated in the present disclosure.

The present disclosure provides a touch sensor, in which the peripheral traces of the touch sensor includes metal nanowires, and a line width and a line spacing of the peripheral traces are each designed to be within a specific numerical range. Accordingly, the touch sensor of the present disclosure can not only meet the requirements of narrow bezel design, but also meet the requirements of electrical specifications for the touch sensor, thereby meeting the demand of the market.

FIG. 1A is a schematic top view illustrating a touch sensor 100 according to some embodiments of the present disclosure. The touch sensor 100 of the present disclosure includes a substrate 110, a touch electrode layer 120, and a peripheral circuit layer 130. In some embodiments, the touch sensor 100 has a visible area VA and a peripheral area PA, and the peripheral area PA is disposed on the sides of the visible area VA. For example, the peripheral area PA may be a frame-shaped area disposed around (i.e., including the right, left, upper, and lower sides of) the visible area VA. As another example, the peripheral area PA may be an L-shaped area disposed on the left and lower sides of the visible area VA. In the embodiment of FIG. 1A, the peripheral area PA is disposed on two opposite sides (e.g., the left and right sides) of the visible area VA.

The substrate 110 is configured to carry the touch electrode layer 120 and the peripheral circuit layer 130, and may be, for example, a rigid transparent substrate or a flexible transparent substrate. In some embodiments, a material of the substrate 110 includes, but is not limited to, transparent materials such as glass, acrylic, polyvinyl chloride, cycloolefin polymer, cycloolefin copolymer, polypropylene, polystyrene, polycarbonate, polyethylene terephthalate, polyethylene naphthalate, colorless polyimide, or combinations thereof.

The touch electrode layer 120 is disposed on a surface of the substrate 110 and may be patterned to include a plurality of touch electrodes 122 corresponding to the visible area VA. In the embodiment of FIG. 1A, the touch electrode layer 120 is an example of a single-layer electrode structure disposed on a single surface of the substrate 110. In some other embodiments, the touch electrode layer 120 may be, for example, a double-sided single-layer, single-sided double-layer, or bridge-type single-layer electrode structure. In some embodiments, the touch electrodes 122 may be arranged in a non-interlaced manner. For example, the touch electrodes 122 may be strip-shaped electrodes extending along a first direction D1 and arranged at intervals along a second direction D2, in which the first direction D1 is perpendicular to the second direction D2. It should be understood that the configuration of the touch electrodes 122 is not the focus of the present disclosure and is not intended to limit the present disclosure.

In some embodiments, the touch electrode layer 120 may include a matrix and a plurality of metal nanowires (also called metal nanostructures) distributed in the matrix. The matrix may include polymers or mixtures thereof to impart specific chemical, mechanical, and optical properties to the metal nanowires. For example, the matrix can provide good adhesion between the metal nanowires and the substrate 110. As another example, the matrix can also provide good mechanical strength for the metal nanowires. In some embodiments, the matrix may include a specific polymer, such that the metal nanowires have additional scratch/wear-resistant surface protection, thereby improving the surface strength of the touch electrode layer 120. The foregoing specific polymer may be, for example, polyacrylate, epoxy resin, polyurethane, polysiloxane, polysilane, poly (silicon-acrylic acid), or combinations thereof. In some embodiments, the matrix may further include a surfactant, a cross-linking agent, a stabilizer (including but not limited to, for example, an antioxidant or an ultraviolet stabilizer), a polymerization inhibitor, or combinations of any of the foregoing ingredients, in order to improve the ultraviolet resistance of the touch electrode layer 120 and prolong a service life of the touch electrode layer 120 or the touch sensor 100.

It should be understood that the term "metal nanowire" used herein is a collective noun, which refers to a collection of metal wires that include multiple metal elements, metal alloys, or metal compounds (including metal oxides), and the number of metal nanowires included therein does not affect the scope of the present disclosure. In some embodiments, a cross-sectional size (e.g., a diameter of the cross section) of a single metal nanowire can be less than 500 nm, preferably less than 100 nm, and more preferably less than 50 nm. In some embodiments, the metal nanowire has a large aspect ratio (i.e., length:diameter of the cross section). Specifically, the aspect ratio of the metal nanowire may be between 10 and 100,000. In more detail, the aspect ratio of the metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

The peripheral circuit layer 130 is disposed on a surface of the substrate 110 and corresponds to the peripheral area PA, and the peripheral circuit layer 130 may be patterned to include a plurality of peripheral traces 132, in which each of the peripheral traces 132 includes a matrix and a plurality of metal nanowires distributed in the matrix. In some embodiments, each of the peripheral traces 132 and each of the touch electrodes 122 are in contact with each other at a boundary of the visible area VA and the peripheral area PA, so as to be electrically connected to each other to form an electron transferring path across the visible area VA and the peripheral area PA. In some embodiments, the peripheral traces 132 may further be connected to an external controller for touch or other signal transmission. It is worth noting that the substrate 110 corresponding to the peripheral area PA is mainly configured to accommodate the peripheral traces 132, in which the line width of each of the peripheral traces 132 and the line spacing of two adjacent peripheral traces 132 have a significant influence on the size of the peripheral area PA (e.g., a width W1 of the peripheral area PA) of the touch sensor 100, and the size of the peripheral area PA can further affect the bezel size of the terminal product. Accordingly, in the present disclosure, the line width and the line spacing of the peripheral traces 132 in the peripheral area PA are each designed to fall within a specific numerical range according to some structures and manufacturing processes that are practically implementable, such that the touch sensor 100 meets the requirements of narrow bezel design and electrical specifications for the touch sensor 100.

Figure 1B:
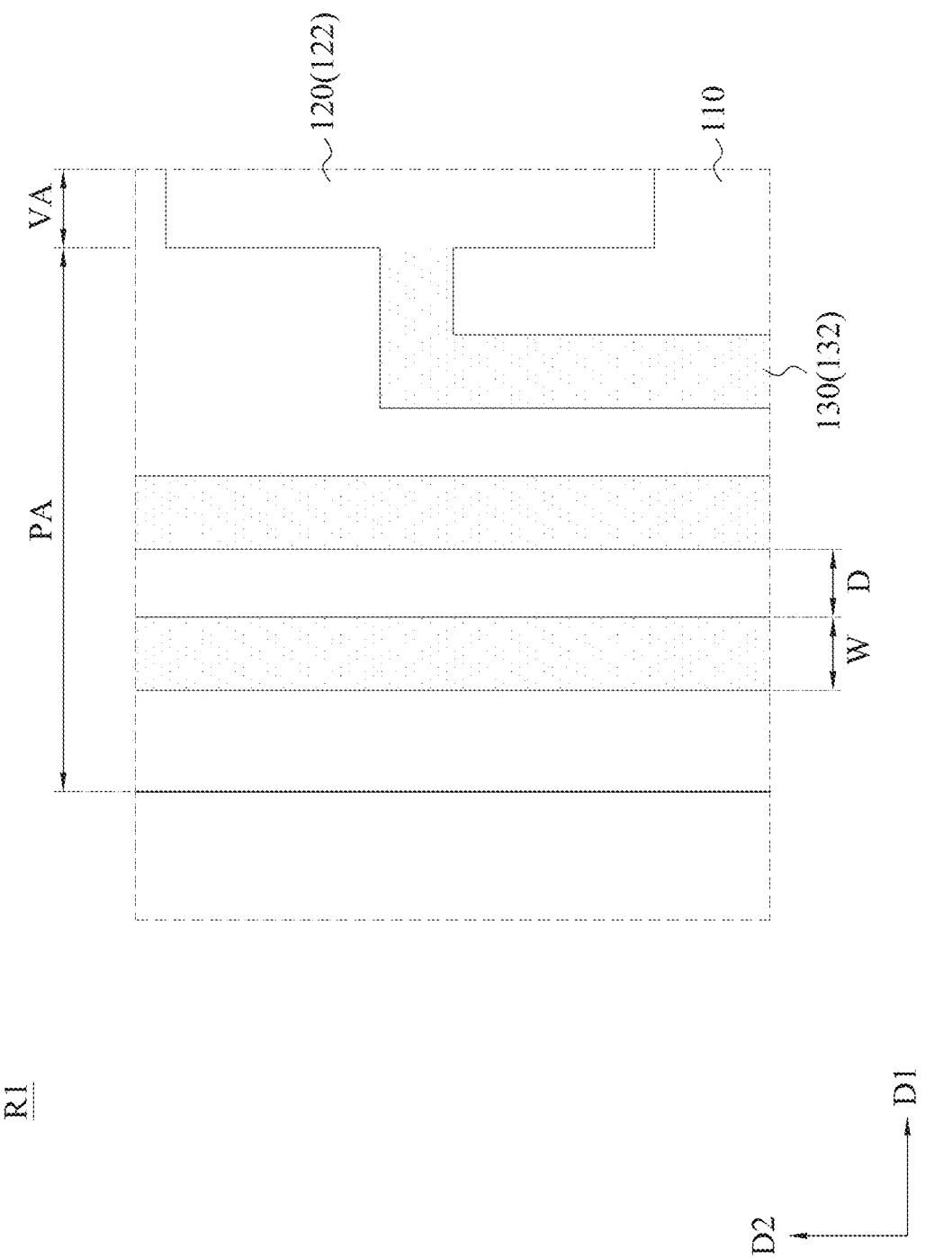
FIG. 1B is a schematic partial enlargement view illustrating the region R1 of the touch sensor in FIG. 1A according to some embodiments of the present disclosure.

FIG. 1B is a schematic partial enlargement view illustrating the region R1 of the touch sensor 100 in FIG. 1A according to some embodiments of the present disclosure. Reference is made to FIG. 1A and FIG. 1B. As mentioned above, the line width W and the line spacing D of the peripheral traces 132 of the present disclosure are each within a specific numerical range, such that the touch sensor 100 not only meets the requirements of narrow bezel design, but also meet the requirements of electrical specifications for the touch sensor 100, thereby meeting the demand of the market. Specifically, the line width W of each of the peripheral traces 132 is more than or equal to 6 μm and less than or equal to 12 μm, and the line spacing D of any two adjacent peripheral traces 132 is more than or equal to 6 μm and less than or equal to 12 μm. That is, the line width W and the line spacing D can be between 6 μm and 12 μm. The numerical range of the line width W and the line spacing D is of critical significance. In detail, when trying to manufacture the peripheral traces 132 with a line width W and line spacing D smaller than 6 μm, an open circuit of the peripheral traces 132 may occur due to the excessively small line width W, and a short circuit of the peripheral traces 132 may also occur due to the excessively small line spacing D, causing the failure of the touch sensor 100 to meet the requirements of electrical specifications for the touch sensor 100. When manufacturing the peripheral traces 132 with a line width W and line spacing D larger than 12 μm, the touch sensor 100 cannot meet the narrow bezel size application and design due to the excessively large line width W and line spacing D of the peripheral traces 132. In other words, by designing the line width W of each of the peripheral traces 132 and the line spacing D of any two adjacent peripheral traces 132 to be between 6 μm and 12 μm, the touch sensor 100 can satisfy the market demand for narrow bezel products while meeting the requirements of electrical specifications for the touch sensor 100. Further, in order to implement a more flexible routing layout of the peripheral traces 132 under the demand for narrow bezel products, the line width W of each of the peripheral traces 132 and the line spacing D of any two adjacent peripheral traces 132 can be less than 10 μm, and preferably less than 8 μm.

In some embodiments, taking the peripheral area PA on one side of the visible area VA as an example, based on the line width W and the line spacing D of the peripheral traces 132 being within the aforementioned specific numerical range, a ratio of a width W1 of the peripheral area PA to a width W2 of the visible area VA of the touch sensor 100 may be between 0.003 and 0.010, such that the terminal product made of the touch sensor 100 has a high screen-to-body ratio, and the terminal product can meet the requirements of narrow bezel design. It should be noted that "the width W1 and the width W2" herein respectively refers to the width of the peripheral area PA and the width of the visible area VA extending along the first direction D1 and respectively refers to the width of the peripheral area PA and the width of the visible area VA on a same horizontal plane (e.g., a horizontal plane parallel to the plane of the drawings).

In the touch sensor 100 of the present disclosure, the aforementioned peripheral traces 132 with the line width W and the line spacing D within the specific numerical range may be implemented into a variety of structures. Specifically, reference is made to FIGS. 2A to 2C, which are schematic cross-sectional views illustrating the touch sensor 100 in FIG. 1A taken along line A-A' according to different embodiments of the present disclosure. In the following descriptions, a variety of structures and manufacturing processes of the peripheral traces 132 will be described in detail.

Figure 2A:
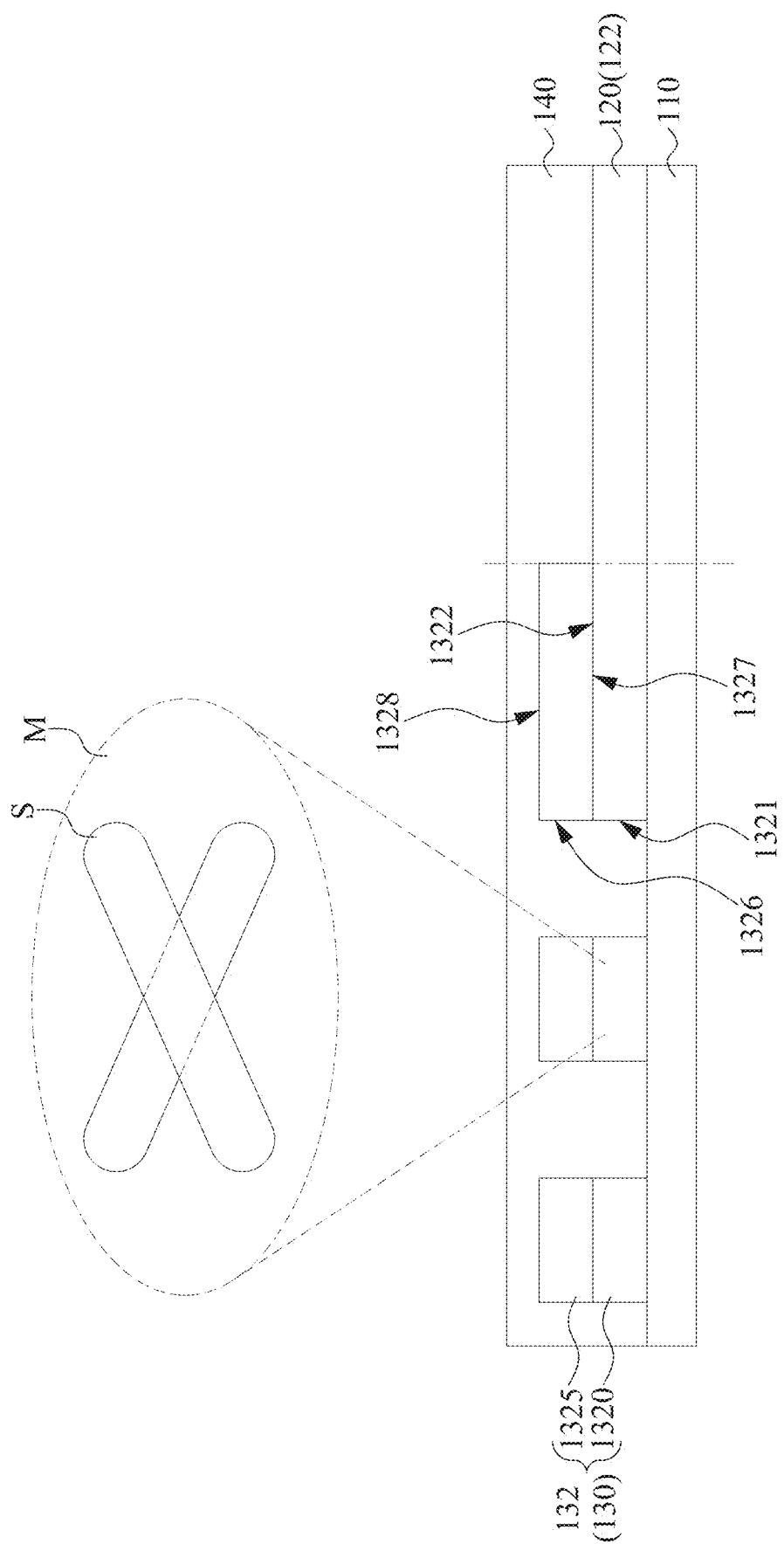
FIGS. 2A-2C are schematic cross-sectional views illustrating the touch sensor in FIG. 1A taken along line A-A' according to different embodiments of the present disclosure.

Reference is made to FIG. 1A and FIG. 2A. In the embodiment of FIG. 2A, each of the peripheral traces 132 includes a first conductive layer 1320 and a second conductive layer 1325 disposed in a stack, in which the first conductive layer 1320 is between the second conductive layer 1325 and the substrate 110, and the first conductive layer 1320 is in contact with the second conductive layer 1325. In some embodiments, the first conductive layer 1320 includes a matrix M and a plurality of metal nanowires S distributed in the matrix M. That is, the first conductive layer 1320 is a metal nanowire layer including the matrix M and the metal nanowires S distributed in the matrix M. In addition, the matrix M and the metal nanowires S in the first conductive layer 1320 are substantially identical to the matrix and the metal nanowires in the touch electrode layer 120. In other words, a portion of the metal nanowire layer including the matrix M and the metal nanowires S forms the first conductive layer 1320 in the peripheral area PA, and a portion of the metal nanowire layer including the matrix M and the metal nanowires S forms the touch electrode layer 120 in the visible area VA, in which the first conductive layer 1320 and the and the touch electrode layer 120 connected and corresponding to the first conductive layer 1320 are integrally formed as one piece without any interface therebetween.

Based on the above, the touch electrode layer 120 and the peripheral circuit layer 130 can be directly and electrically connected with each other by integrally forming the first conductive layer 1320 of the peripheral trace 132 and the touch electrode 122. In other words, the touch electrode 122 and the first conductive layer 1320 belong to different portions of a single metal nanowire layer. Accordingly, there is no need for an additional contact structure for realizing the electrical contact between the peripheral traces 132 and the touch electrodes 122, such that an area occupied by the contact structure in the peripheral area PA can be saved. In some embodiments, the first conductive layer 1320 and the touch electrode layer 120 may be disposed on a same horizontal plane (e.g., a horizontal plane formed by the first direction D1 and the second direction D2).

In some embodiments, a sidewall 1321 of the first conductive layer 1320 is substantially aligned with a sidewall 1326 of the second conductive layer 1325, and an upper surface 1322 of the first conductive layer 1320 is in contact with a lower surface 1327 of the second conductive layer 1325. In some embodiments, a contour of the upper surface 1322 of the first conductive layer 1320 and a contour of the lower surface 1327 of the second conductive layer 1325 may be conformal. That is, the lower surface 1327 of the second conductive layer 1325 may extend along a contour of the upper surface 1322 of the first conductive layer 1320, and the lower surface 1327 of the second conductive layer 1325 is closely stacked with the upper surface 1322 of the first conductive layer 1320. In some embodiments, the pattern and size (e.g., length, width, and height) of the first conductive layer 1320 may be identical or similar to the pattern and size of the second conductive layer 1325. For example, the first conductive layer 1320 and the second conductive layer 1325 may both have a strip-shape pattern, and the width (e.g., line width) of the first conductive layer 1320 is identical or similar to the width of the second conductive layer 1325. In other words, a vertical projection of the first conductive layer 1320 on the substrate 110 can completely overlap a vertical projection of the second conductive layer 1325 on the substrate 110. It should be noted that, for clarity and convenience of descriptions, the first conductive layer 1320 and the second conductive layer 1325 in FIG. 2A are illustrated as having rectangular cross-sectional shapes. However, the shapes of the first conductive layer 1320 and the second conductive layer 1325 can be changed according to actual applications and are not intended to limit the present disclosure.

Furthermore, since the first conductive layer 1320 and the touch electrode layer 120 are formed in the peripheral area PA and the visible area VA by coating the entire surface of the substrate 110 with the metal nanowire layer through a patterning process, in order to ensure that the first conductive layer 1320 provides good conductivity and that the touch electrode layer 120 provides good light transmittance, in some embodiments, a light transmittance of the metal nanowire layer to visible light (e.g., light with a wavelength between 400 nm and 700 nm) may be greater than about 80%, and a surface resistivity of the metal nanowire layer may be between 10 ohms/square and 1000 ohms/square. In a preferred embodiment, the light transmittance of the metal nanowire layer to visible light may be greater than about 85%, and the surface resistivity of the metal nanowire layer may be between 50 ohms/square and 500 ohms/square.

In some embodiments, the second conductive layer 1325 may be made of a metal material with good conductivity. In some embodiments, the second conductive layer 1325 may be a single-layer conductive structure made of a single metal material or an alloy material, such as a copper layer or a silver layer; or the second conductive layer 1325 may be a bilayer or multi-layer structure made of two or more metal materials or alloy materials, such as copper/nickel layer, molybdenum/aluminum layer, titanium/aluminum/titanium layer, or molybdenum/aluminum/molybdenum layer; or the second conductive layer 1325 may be a bilayer or multi-layer structure made of a metal material and a metal oxide material, such as indium zinc oxide/silver/indium zinc oxide layers. The above conductive structures are preferably opaque. In some embodiments, a surface resistivity of the second conductive layer 1325 may be between 0.05 ohms/square and 0.5 ohms/square.

In some embodiments, the touch sensor 100 may further include a film layer 140, and the film layer 140 covers an entirety of the peripheral circuit layer 130. In more detail, the film layer 140 covers each of the peripheral traces 132 and is further filled between the adjacent peripheral traces 132, so as to electrically insulate the adjacent peripheral traces 132 to avoid short circuits. In some embodiments, the film layer 140 may include an insulating material. For example, the insulating material may include non-conductive resin or other organic materials, such as but not limited to, polyacrylate, epoxy resin, polyurethane, polysilane, polysiloxane, polyethylene, polypropylene, polycarbonate, polyvinyl butyral, poly(silicon-acrylic), poly(styrene sulfonic acid), acrylonitrile-butadiene-styrene copolymer, poly(3,4-ethylenedioxythiophene), ceramic materials, or combinations thereof. In some embodiments, the aforementioned metal nanowires S do not exist in the film layer 140 (i.e., the concentration of the metal nanowires S in the film layer 140 is zero), so as to achieve a good insulation effect. In some embodiments, for a single peripheral trace 132, the film layer 140 may surround and be in contact with the sidewall 1321 of the first conductive layer 1320 and the sidewall 1326 and the upper surface 1328 of the second conductive layer 1325. In some embodiments, the film layer 140 may extend to the visible area VA to cover the entire surface of each of the touch electrodes 122 of the touch electrode layer 120 and may further be filled between the adjacent touch electrodes 122, so as to electrically insulate the adjacent touch electrodes 122 to avoid short circuits.

In some embodiments, when the insulating material used to form the film layer 140 is coated on the substrate 110 to cover the peripheral traces 132, a portion of the insulating material may infiltrate into a space between the adjacent peripheral traces 132 and may further cover the protruding portions of some of the metal nanowires S partially protruding from the metal nanowire layer, such that some of the metal nanowires S are partially embedded in the film layer 140 after curing.

It should be understood that the component connection relationships, materials, and advantages described above will not be repeated hereinafter. In the following descriptions, a manufacturing method of the touch sensor 100 of FIG. 2A will be briefly described. The manufacturing method of the touch sensor 100 of FIG. 2A includes step S10 to step S16, and step S10 to step S16 can be performed sequentially.

Firstly, a substrate 110 is provided, and in step S10, a metal nanowire layer including metal nanowires S is coated and formed on an entire surface of the substrate 110 (including the surface corresponding to the visible area VA and the peripheral area PA). In some embodiments, the metal nanowire layer may further include matrix M. In some embodiments, a dispersion or slurry including the metal nanowires S may be formed on the surface of the substrate 110 by processes such as screen printing, nozzle coating, or roller coating, and the dispersion or slurry is then cured or dried to form the metal nanowire layer disposed on the substrate 110. In some embodiments, a roll-to-roll process may be performed, such that the dispersion or slurry is coated on the surface of the substrate 110 supplied continuously. After the curing or drying step, solvent and other substances in the dispersion or slurry will volatilize, and the metal nanowires S can be randomly distributed on the surface of the substrate 110, or preferably, the metal nanowires S can be fixed on the surface of the substrate 110 without falling off to form the metal nanowire layer. The metal nanowires S in the metal nanowire layer can contact each other to provide a continuous current path, so as to form a conductive network. That is, the metal nanowires S contact each other at their intersection positions to form a path for transferring electrons. In some embodiments, pre-treatments may be performed on the surface of the substrate 110. For example, a surface modification process is performed or an adhesive layer or a resin layer is additionally coated on the surface of the substrate 110 to enhance the adhesion between the substrate 110 and the metal nanowire layer.

In some embodiments, the dispersion or slurry includes a solvent, such that the metal nanowires S are uniformly dispersed in the solvent. Specifically, the solvent is, for example, water, alcohols, ketones, ethers, hydrocarbons, aromatic solvents (benzene, toluene, xylene, etc.), or combinations thereof. In some embodiments, the dispersion may further include additives, surfactants, and/or binding agents to improve the compatibility between the metal nanowires S and the solvent and the stability of the metal nanowires S in the solvent. Specifically, the additives, surfactants, and/or binding agents may be, for example, carboxymethyl cellulose, hydroxyethyl cellulose, hypromellose, fluorosurfactant, sulfosuccinate sulfonate, sulfate, phosphate, disulfonate, or combinations thereof.

In some embodiments, post-treatments may be further performed to the metal nanowires S to improve the contact characteristics (e.g., increase the contact area) of the metal nanowires S at their intersection positions, so as to enhance the conductivity of the metal nanowires S. The post-treatments may include steps such as, but not limited to, heating, plasma providing, corona discharging, ultraviolet providing, ozone providing, or pressurizing. Specifically, after the metal nanowire layer is formed by curing or drying, one or more rollers may be used to apply pressure onto the metal nanowire layer. In some embodiments, the heating and pressurizing steps of the post-treatments can be performed on the metal nanowires S at the same time, so as to enhance the conductivity of the metal nanowires S. In some embodiments, the metal nanowires S may be exposed to a reducing agent for the post-treatment. For example, the metal nanowires S including silver nanowires may preferably be exposed to a silver reducing agent for the post-treatment. In some embodiments, the silver reducing agent may include a borohydride such as sodium borohydride, a boron nitrogen compound such as dimethylamine borane, or a gas reducing agent such as hydrogen. After the post-treatments are performed, the contact strength or contact area of the metal nanowires S at their intersection positions can be strengthened.

Next, in step S12, a metal material layer including a metal with good conductivity is formed on the entire surface of substrate 110 in the peripheral area PA to cover the metal nanowire layer in the peripheral area PA. After this step is performed, the metal nanowire layer is disposed on the entire surface of the substrate 110 corresponding to the visible area VA and the peripheral area PA, and the metal material layer is disposed on the entire surface of the metal nanowire layer corresponding to the peripheral area PA.

Subsequently, in step S14, a patterning step is performed to the metal material layer and the metal nanowire layer, such that the metal nanowire layer in the visible area VA as well as the metal material layer and the metal nanowire layer in the peripheral area PA are respectively defined with their patterns, thereby forming the touch electrode layer 120 in the visible area VA and the peripheral circuit layer 130 in the peripheral area PA. In detail, the portion of the metal nanowire layer in the visible area VA may be patterned to form a plurality of touch electrodes 122, the portion of the metal nanowire layer in the peripheral area PA may be patterned to form a plurality of first conductive layers 1320, and the metal material layer in the peripheral area PA may be patterned to form a plurality of second conductive layers 1325. Accordingly, the first conductive layer 1320 and the second conductive layer 1325 corresponding to and above the first conductive layer 1320 together form an entirety of one periphery trace 132.

In some embodiments, the touch electrode layer 120 and the peripheral circuit layer 130 may be patterned by etching, and the touch electrode layer 120 and the peripheral circuit layer 130 may be formed in a same etching step or different etching steps. For the patterning of the peripheral circuit layer 130, in each of the peripheral traces 132 formed by etching, a sidewall 1321 of the first conductive layer 1320 and a sidewall 1326 of the second conductive layer 1325 may be a co-planar etching surface. That is, the sidewall 1321 of the first conductive layer 1320 and the sidewall 1326 of the second conductive layer 1325 are formed in the same etching step. Alternatively, the sidewall 1326 of the second conductive layer 1325 and the sidewall 1321 of the first conductive layer 1320 may be formed separately and sequentially in different etching steps.

Then, in step S16, an insulating material is coated on the substrate 110 to cover an entirety of the peripheral circuit layer 130 and an entirety of the touch electrode layer 120, and the insulating material is cured/dried to form the film layer 140 on the surface of the substrate 110. In some embodiments, the insulating material may further infiltrate into a space between the adjacent peripheral traces 132 and a space between the adjacent touch electrodes 122, such that the adjacent peripheral traces 132 and the adjacent touch electrodes 122 are electrically insulated by the film layer 140 formed after curing/drying. In some embodiments, the insulating material infiltrating into the space between the adjacent peripheral traces 132 and the space between the adjacent touch electrodes 122 may further cover the protruding portions of some of the metal nanowires S partially protruding from the metal nanowire layer, such that some of the metal nanowires S are partially embedded in the film layer 140.

After performing the above steps S10 to S16, the touch sensor 100 shown in FIG. 2A can be obtained. By integrally forming the first conductive layer 1320 of the peripheral trace 132 and the touch electrode 122 to directly form an electrical connection design, there is no need for an additional contact structure for realizing the electrical contact between the peripheral traces 132 and the touch electrodes 122, such that an area occupied by the contact structure in the peripheral area PA can be saved. As such, in combination with the design of the line width W of each of the peripheral traces 132 being between 6 μm and 12 μm and the line spacing D of any two adjacent peripheral traces 132 being between 6 μm and 12 μm, the overall width W1 of the peripheral area PA can be reduced, such that the touch sensor 100 can meet the requirements of narrow bezel design.

Figure 2B:
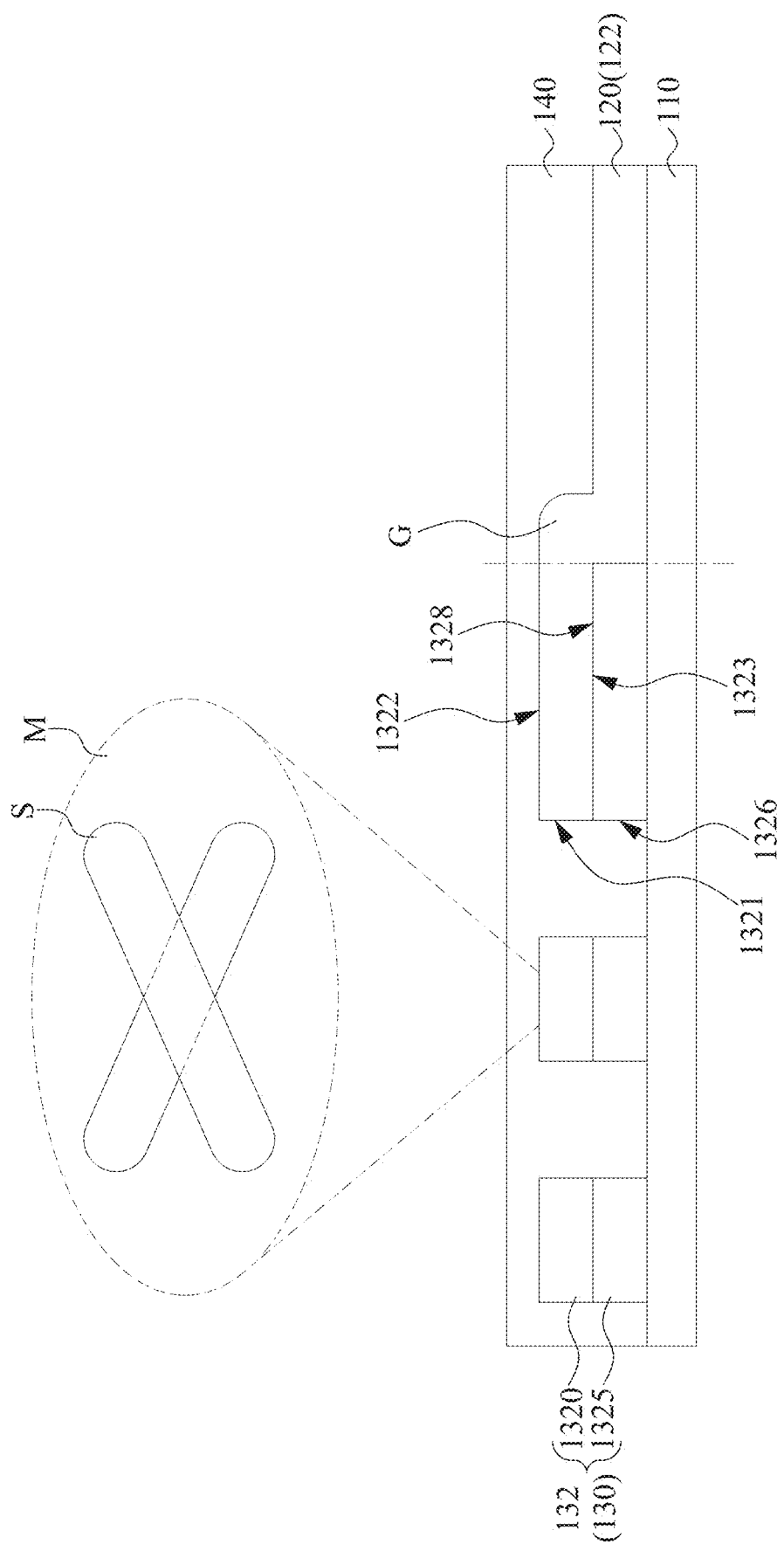

Reference is made to FIG. 1A and FIG. 2B. In the embodiment of FIG. 2B, each of the peripheral traces 132 includes a first conductive layer 1320 and a second conductive layer 1325 disposed in a stack. It is noted that the touch sensor 100 of FIG. 2B and the touch sensor 100 of FIG. 2A have substantially the same component configuration and connection relationships, materials, and advantages. Only the differences between the touch sensor 100 of FIG. 2B and the touch sensor 100 of FIG. 2A will be discussed in the following descriptions, and the related descriptions of the touch sensor 100 of FIG. 2A in the foregoing can be referenced for additional details.

At least one difference between the embodiment of FIG. 2B and the embodiment of FIG. 2A is that in the peripheral trace 132 of FIG. 2B, the second conductive layer 1325 is between the first conductive layer 1320 and the substrate 110, in which a lower surface 1323 of the first conductive layer 1320 is in contact with an upper surface 1328 of the second conductive layer 1325, and the second conductive layer 1325 and the touch electrode layer 120 are located on a same horizontal plane (e.g., a horizontal plane formed by the first direction D1 and the second direction D2). In other words, in this embodiment, the first conductive layer 1320 and the touch electrode layer 120 are on different horizontal planes (e.g., a horizontal plane where the first conductive layer 1320 is located is higher than a horizontal plane where the touch electrode layer 120 is located), and the first conductive layer 1320 is connected to the touch electrode 122 corresponding to the first conductive layer 1320 by a climbing section G. In some embodiments, the first conductive layer 1320, the climbing section G, and the touch electrode 122 connected to each other are integrally formed, and there is substantially no interface between the first conductive layer 1320, the climbing section G, and the touch electrode 122. In some embodiments, the first conductive layer 1320, the climbing section G, and the touch electrode 122 may be, for example, formed on the substrate 110 in conformal manner. In some embodiments, a contour of the upper surface 1328 of the second conductive layer 1325 and a contour of the lower surface 1323 of the first conductive layer 1320 may be conformal. That is, the lower surface 1323 of the first conductive layer 1320 may extend along the contour of the upper surface 1328 of the second conductive layer 1325, and the lower surface 1323 of the first conductive layer 1320 is closely stacked with the upper surface 1328 of the second conductive layer 1325.

Moreover, for a single peripheral trace 132, the film layer 140 may surround and be in contact with the sidewall 1321 and the upper surface 1322 of the first conductive layer 1320 and the sidewall 1326 of the second conductive layer 1325. In addition, after the insulating material used to form the film layer 140 is coated on the substrate 110 to cover the peripheral traces 132, a portion of the insulating material may cover the protruding portions of some of the metal nanowires S partially protruding from the sidewall 1321 and the upper surface 1322 of the first conductive layer 1320 of the metal nanowire layer, such that some of the metal nanowires S are partially embedded in the film layer 140 after curing.

In the following descriptions, a manufacturing method of the touch sensor 100 of FIG. 2B will be briefly described. It is noted that the manufacturing method of the touch sensor 100 of FIG. 2B and the manufacturing method of the touch sensor 100 of FIG. 2A are substantially identical. Only the differences between the manufacturing method of the touch sensor 100 of FIG. 2B and the manufacturing method of the touch sensor 100 of FIG. 2A will be discussed in the following descriptions, and the related descriptions of the manufacturing method of the touch sensor 100 in FIG. 2A in the foregoing can be referenced for additional details.

Specifically, in the manufacturing method of the touch sensor 100 of FIG. 2B, the sequences of step S10 and step S12 in the manufacturing method of the touch sensor 100 of FIG. 2A are reversed. In detail, after the substrate 110 is provided, the metal material layer can be formed on the substrate 110 in the peripheral area PA, and then the metal nanowire layer can be formed on the substrate 110 in the visible area VA and on the metal material layer in the peripheral area PA, such that the metal nanowire layer covers the metal material layer in the peripheral area PA. Since the metal material layer is not formed in the visible area VA, the metal material layer will form a step region at a boundary between the visible area VA and the peripheral area PA, and the metal nanowire layer can cover the step region to form a climbing section G. Subsequently, the metal material layer and the metal nanowire layer can also be patterned to form the touch electrode layer 120 in the visible area VA and the peripheral circuit layer 130 in the peripheral area PA, in which the metal nanowire layer in the visible area VA can be patterned to form a plurality of touch electrodes 122, the metal nanowire layer in the peripheral area PA can be patterned to form a plurality of first conductive layers 1320, and the metal material layer in the peripheral area PA can be patterned to form a plurality of second conductive layers 1325. Accordingly, the first conductive layer 1320 and the second conductive layer 1325 corresponding to and above the first conductive layer 1320 together form an entirety of one periphery trace 132. Then, the insulating material can be coated on the substrate 110 to form the film layer 140 disposed on the surfaces of the substrate 110, the touch electrode layer 120, and the peripheral circuit layer 130.

In the manufacturing method of the touch sensor 100 of FIG. 2B, by integrally forming the first conductive layer 1320 of the peripheral trace 132 and the touch electrode 122 to directly form an electrical connection design, there is no need for an additional contact structure for realizing the electrical contact between the peripheral traces 132 and the touch electrodes 122, such that an area occupied by the contact structure in the peripheral area PA can be saved. As such, in combination with the design of the line width W of each of the peripheral traces 132 being between 6 μm and 12 μm and the line spacing D of any two adjacent peripheral traces 132 being between 6 μm and 12 μm, the overall width W1 of the peripheral area PA can be reduced, such that the touch sensor 100 can meet the requirements of narrow bezel design.

Figure 2C:
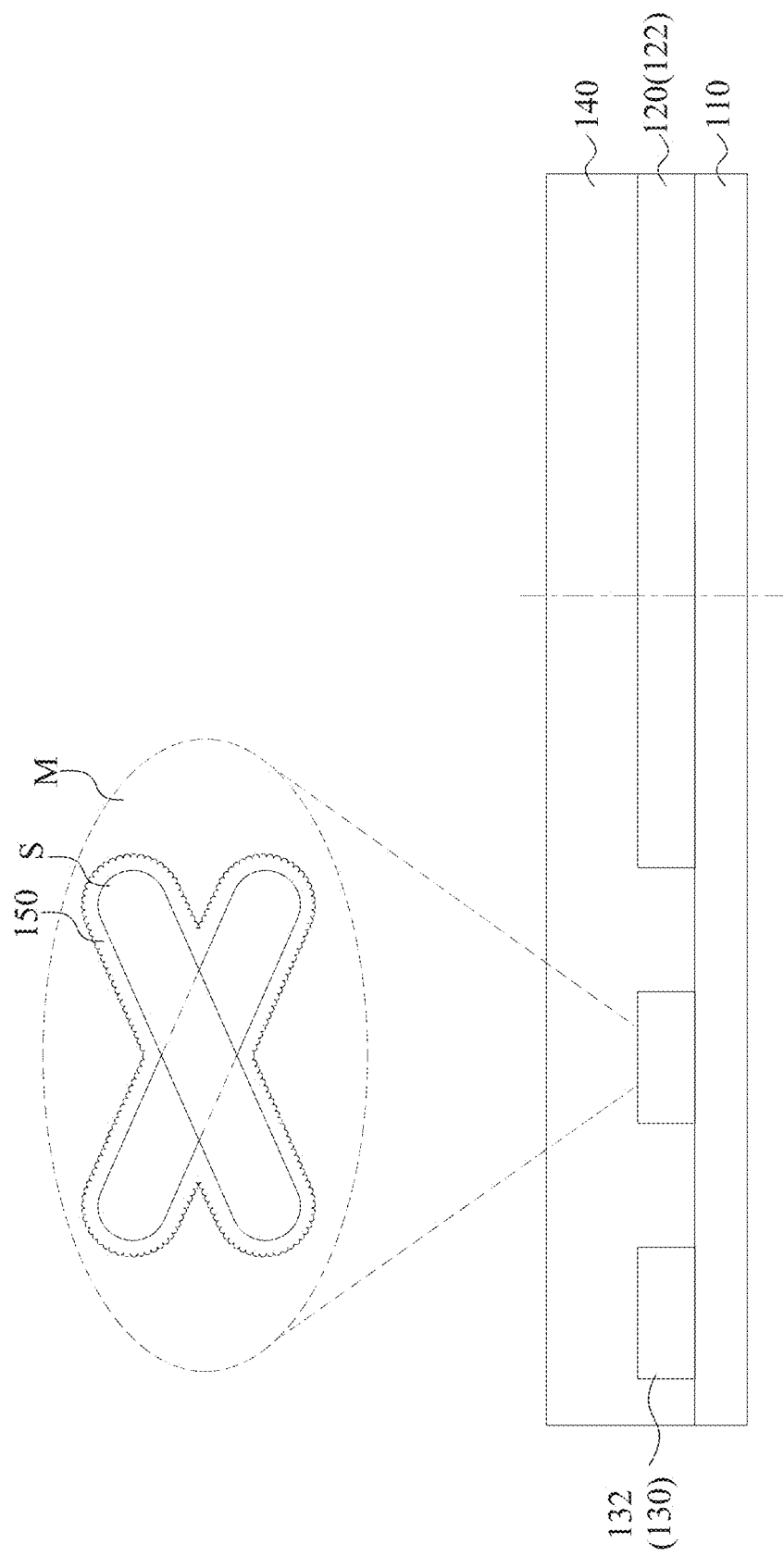

Reference is made to FIGS. 1A and 2C. In the embodiment of FIG. 2C, each of the peripheral traces 132 includes a matrix M and a plurality of metal nanowires S distributed in the matrix M, and a covering structure 150 is on an interface between the matrix M and each of the metal nanowires S. In other words, each of the peripheral traces 132 of the peripheral circuit layer 130 at least includes a modified metal nanowire (the "modified metal nanowire" referred herein includes the metal nanowire S and the covering structure 150 that covers a surface of the metal nanowire S). In some embodiments, the covering structure 150 may be a plating layer which may be formed by electroless plating/electrolysis. Since the metal used for electroless plating/electrolysis will generally grow/precipitate along the shape of the metal nanowire S, the covering structure 150 uniformly covers the metal nanowire S along the profile of the metal nanowire S. On the other hand, since there is no metal precipitation in the matrix M in the position without metal nanowires S, the covering structure 150 does not exist alone in the matrix M. Overall, the covering structure 150 is filled between the adjacent metal nanowires S, and the covering structure 150 is between the metal nanowires S and the matrix M, in which the covering structure 150 and the metal nanowire S covered by the covering structure 150 can be regarded as an entirety, and the gaps between the entireties are occupied by the matrix M. The conductivity of the metal nanowire S covered by the covering structure 150 (i.e., the modified metal nanowire) is higher than the conductivity of the unmodified metal nanowire S. Based on the above, electrons can preferably be transferred in the peripheral trace 132 through the modified metal nanowires that are adjacent and in contact with each other. As such, the surface resistivity of the touch sensor 100 can be reduced, and the conductivity of the touch sensor 100 can be improved.

In some embodiments, the covering structure 150 can cover an entirety of the interface between the metal nanowire S and the matrix M, so as to uniformly form a covering layer on the interface between the metal nanowire S and the matrix M. In some embodiments, a coverage rate of the covering structure 150 may be more than about 80%, about 90% to about 95%, about 90% to about 99%, or about 90% to 100% of the total surface area of the metal nanowires S. It should be understood that when the covering rate of the covering structure 150 is said to be 100%, it means that the surfaces of the initial metal nanowires S are totally not exposed. In some embodiments, the covering structure 150 may be a layered structure, an island-shaped protruding structure, a dot-shaped protruding structure, or combinations thereof which include a conductive material. In some embodiments, the conductive material may, for example, include silver, gold, platinum, nickel, copper, iridium, rhodium, palladium, osmium, an alloy including the foregoing materials, or an alloy not including the foregoing materials. In some embodiments, the covering structure 150 may be a single-layer structure made of a single conductive material, such as an electroless copper plating layer, an electroplating copper layer, or an electroless copper-nickel alloy plating layer; or the covering structure 150 may be a bilayer or multi-layer structure made of two or more conductive materials, for example, an electroless copper plating layer is formed first, and an electroless silver plating layer is formed thereafter.

In some embodiments, the peripheral circuit layer 130 and the touch electrode layer 120 may be on a same horizontal plane (e.g., a horizontal plane formed by the first direction D1 and the second direction D2). In some embodiments, the touch electrode layer 120 in the visible area VA may include the unmodified metal nanowires S. That is, the touch electrode layer 120 may include the metal nanowires S distributed in the matrix M, and the covering structure 150 does not exist on the interface between the matrix M and each of the metal nanowires S. In some other embodiments, the touch electrode layer 120 may be provided with a special pattern design, such as a grid pattern with interlaced thin lines. In such embodiments, the touch electrode layer 120 in the visible area VA can be designed to include the modified metal nanowires under the premise of not being visible. In some embodiments, the touch sensor 100 may further include a film layer 140, and the film layer 140 covers the entire surfaces of the peripheral circuit layer 130 and the touch electrode layer 120 and is further filled between adjacent peripheral traces 132 and between the adjacent touch electrodes 122, such that the adjacent peripheral traces 132 and the adjacent touch electrodes 122 are electrically insulated to avoid short circuits.

It should be understood that the component connection relationships, materials, and advantages described above will not be repeated hereinafter. In the following descriptions, a manufacturing method of the touch sensor 100 of FIG. 2C will be briefly described. The manufacturing method of the touch sensor 100 of FIG. 2C includes step S20 to step S28, and step S20 to step S28 can be performed sequentially.

Firstly, a substrate 110 is provided, and in step S20, a metal nanowire layer including the metal nanowires S and the matrix M is coated and formed on the surface of the substrate 110 in its entirety (including the visible area VA and the peripheral area PA). Reference can be made to the aforementioned step S10 for additional details, which will not be repeated hereinafter.

Next, in step S22, a degree of curing of the matrix M in the metal nanowire layer is controlled, such that the metal nanowires S are embedded in the matrix M in a pre-cured or incompletely cured state. In some embodiments, the coating or curing conditions (e.g., temperature and/or photo-curing parameters) of the matrix M can be controlled to make the matrix M reach a pre-cured or incompletely cured state. In some embodiments, a thickness of the matrix M may be between about 20 nm and about 10 μm, about 50 nm and about 200 nm, or about 30 nm and about 100 nm; for example, the thickness of the matrix M may be about 90 nm or 100 nm. It should be understood that, in order to concisely and clearly describe the present disclosure, the metal nanowires S and the matrix M are shown as an entire structure layer in FIG. 2C, but the present disclosure is not limited in this regard. The metal nanowires S and the matrix M may also be combined into other types of structural layer(s) (e.g., a stacked structure).

Subsequently, in step S24, a patterning step is performed to the metal nanowire layer, such that a portion of the metal nanowire layer in the visible area VA and a portion of metal nanowire layer in the peripheral area PA are respectively defined with their patterns, so as to form a plurality of conductive structures in the visible area VA and the peripheral area PA. In some embodiments, the conductive structures in the visible area VA may be patterned to form the touch electrode layer 120 with the touch electrodes 122, and the conductive structures in the peripheral area PA may be patterned to form a peripheral circuit layer 130 with the peripheral traces 132 in the subsequent modification step. In some embodiments, the conductive structures may be patterned by etching. In some embodiments, the conductive structures in the visible area VA and the peripheral area PA may be etched at the same time, and an etching mask (e.g., a photoresist) may be used to produce the patterned conductive structures in the peripheral area PA and the visible area VA at one time in a same process. In some embodiments, when the metal nanowires S in the metal nanowire layer are silver nanowires, the etching solution may be a composition that can be used to etch silver. For example, the main components of the etching solution can be $H_3PO_4$ (with a volume ratio of about 55% to about 70% $H_3PO_4$ in the etching solution) and $HNO_3$ (with a volume ratio of about 5% to about 15% $HNO_3$ in the etching solution) to remove the silver material in the same process. In some other embodiments, the main components of the etching solution may be ferric chloride/nitric acid or phosphoric acid/hydrogen peroxide.

Next, in step S26, a modification step is performed to form a peripheral circuit layer 130 at least including a plurality of modified metal nanowires in the peripheral area PA. A photoresist, a peelable adhesive, or a similar material layer may be adopted during the modification step to cover the touch electrode layer 120 in the visible area VA, such that the modification step is only performed to the conductive structures in the peripheral area PA. In some embodiments, an electroless copper plating solution (including copper ion solution, chelating agent, alkali agent, reducing agent, buffering agent, stabilizing agent, etc.) can be prepared, and the conductive structures in the peripheral area PA can be immersed into the electroless copper plating solution. The electroless copper plating solution can penetrate into the pre-cured or incompletely cured matrix M and contact the surfaces of the metal nanowires S by capillary phenomenon. At the same time, the metal nanowires S can act as a catalytic point or nucleation point to facilitate the precipitation of copper, such that the electroless copper plating layer is deposited on the metal nanowires S to form the covering structure 150.

During the modification step, the covering structure 150 substantially grows according to the initial shape of the metal nanowires S and forms a structure covering the metal nanowires S as the modification time increases. Since the copper material grows along the surface of each metal nanowire S (i.e., the interface between the metal nanowire S and the matrix M), the shape of the observed copper is quite similar to the initial shape (e.g., a linear structure) of each metal nanowire S after plating, and the copper will grow uniformly to form an outer-layered structure with a similar size (e.g., thickness). In contrast, there is no precipitation of copper in the matrix M where there is no metal nanowire S. That is, by controlling the modification step well, the covering structure 150 is formed on the interface between the matrix M and each metal nanowire S, and there is no covering structure 150 that exists alone in the matrix M without being in contact with the surfaces of the metal nanowires S. In some embodiments, the matrix M and the electroless plating solution/electrolyte solution may include materials that match with each other. For example, when a non-alkali-resistant polymer is being used to prepare the matrix M, the electroless plating solution can be an alkaline solution. Therefore, in this step, in addition to utilizing the aforementioned pre-cured or incompletely cured state of the matrix M, the electroless plating solution can further be utilized to attack (similar to etching) the pre-cured or incompletely cured matrix M to facilitate the aforementioned modification step.

In some embodiments, the growth conditions of the covering structure 150 (e.g., the electroless plating time and/or the component concentration of the electroless plating solution) can be controlled, such that the covering structure 150 only covers the surfaces of the metal nanowires S without over-growing. Moreover, the pre-cured or incompletely cured matrix M can also play a role in limiting or controlling growth. Accordingly, the growth reaction of the covering structure 150 is restricted to the interface between the metal nanowires S and the matrix M, such that the covering structure 150 can be grown in a controlled and uniform manner. As such, the covering structure 150 formed by the modification step does not precipitate/grow alone in the matrix M without contacting the metal nanowires S, but is formed between the matrix M and the surface of each metal nanowire S. In some embodiments, a curing step may be further performed after the modification step, such that the pre-cured or incompletely cured matrix M can reach a fully cured state.

Subsequently, in step S28, an insulating material is coated on the substrate 110 to cover an entirety of the peripheral circuit layer 130 and an entirety of the touch electrode layer 120, and the insulating material is cured/dried to form the film layer 140 on the surface of the substrate 110. In some embodiments, the insulating material may further infiltrate into a space between the adjacent peripheral traces 132 and a space between the adjacent touch electrodes 122, such that the adjacent peripheral traces 132 and the adjacent touch electrodes 122 are electrically insulated by the film layer 140 formed after curing.

After performing the above steps S20 to S28, the touch sensor 100 shown in FIG. 2C can be obtained. Overall, each of the peripheral traces 132 in the peripheral area PA may include the modified metal nanowires, and each of the touch electrodes 122 in the visible area VA may include the modified metal nanowires or the unmodified metal nanowires S. For the peripheral circuit layer 130 in the peripheral area PA, the peripheral trace 132 before being modified is integrally formed with the touch electrode 122 in the visible area VA, so as to directly form an electrical connection. Stated differently, there is no need for an additional contact structure for realizing the electrical contact between the peripheral traces 132 and the touch electrodes 122, such that an area occupied by the contact structure in the peripheral area PA can be saved. As such, in combination with the design of the line width W of each peripheral trace 132 being between 6 μm and 12 μm and the line spacing D of any two adjacent peripheral traces 132 being between 6 μm and 12 μm, the overall width W1 of the peripheral area PA can be reduced, such that the touch sensor 100 can meet the requirements of narrow bezel design.

According to the aforementioned embodiments disclosed in FIGS. 2A to 2C, the peripheral traces 132 can be implemented into a variety of structures. In the following descriptions, optical microscope images will be used to further verify the feasibility of the aforementioned designs of the line width W and line spacing D of the peripheral traces 132. In the optical microscope images of the following embodiments and comparative examples, the peripheral traces 132 are implemented into the structure shown in FIG. 2A, and the metal material of the second conductive layer 1325 of the peripheral traces 132 is copper. In addition, the line width W is an average value of the line widths at three different positions of a single peripheral trace 132, and the line spacing D is an average value of the line spacing at three different positions of two adjacent peripheral traces 132.

Figure 3A:
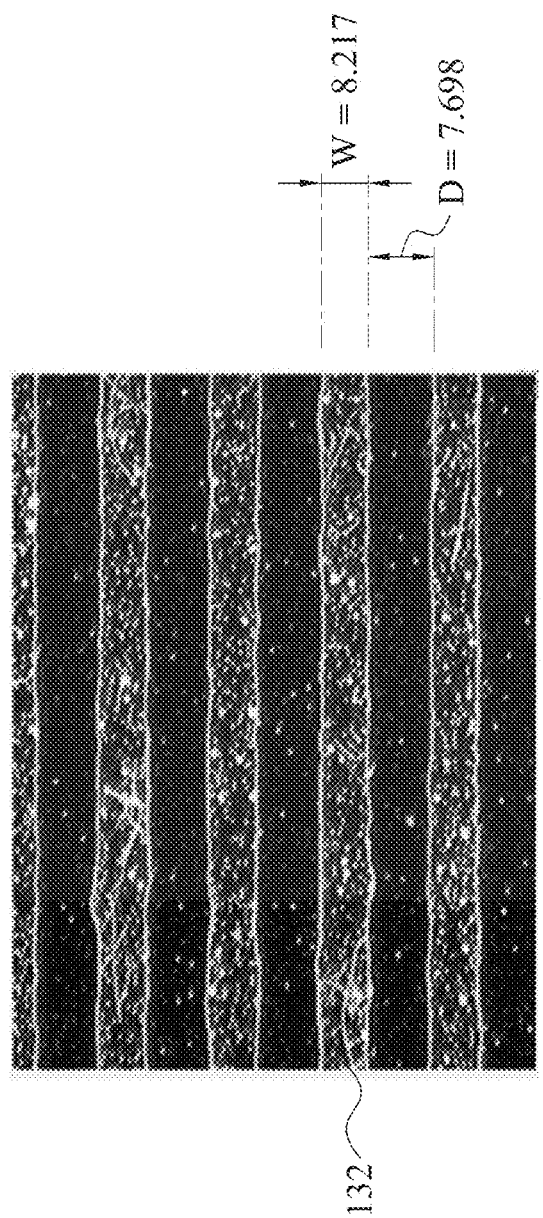
FIGS. 3A and 3B are optical microscope images of the peripheral traces according to some embodiments of the present disclosure.
Figure 3B:
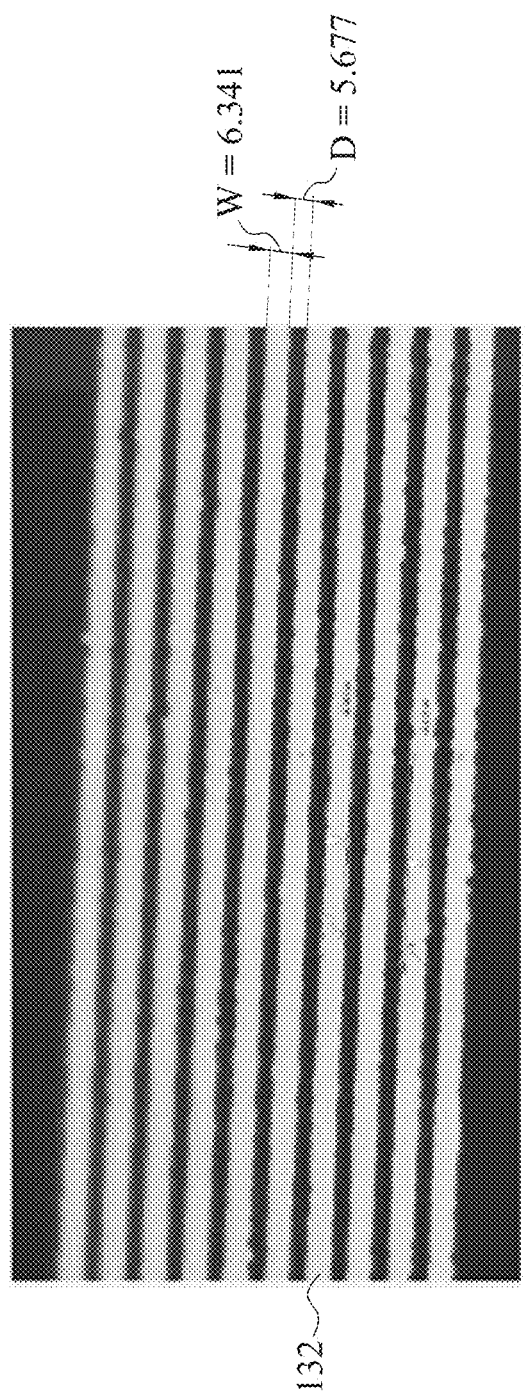

FIGS. 3A and 3B are optical microscope images of the peripheral traces 132 according to some embodiments of the present disclosure. Reference is made to FIG. 3A. The line width W of any of the peripheral traces 132 is about 8 μm, and the line spacing D between two adjacent peripheral traces 132 is also about 8 μm. It can be seen from the optical microscope image shown in FIG. 3A that when the line width W and the line spacing D of the peripheral traces 132 are manufactured to be about 8 μm, the peripheral traces 132 can be well and uniformly formed without short circuit or open circuit. Moreover, when the line width W and the line spacing D are designed to be about 8 μm, the manufactured touch sensor 100 can easily meet the size requirements of narrow bezel products and is more flexible in design. Reference is made to FIG. 3B. The line width W of any of the peripheral traces 132 is about 6 μm, and the line spacing D between two adjacent peripheral traces 132 is also about 6 μm. It can be seen from the optical microscope image shown in FIG. 3B that when the line width W and the line spacing D of the peripheral traces 132 are further reduced to be about 6 μm, the peripheral traces 132 can still be well and uniformly formed without short circuit or open circuit.

Figure 3D:
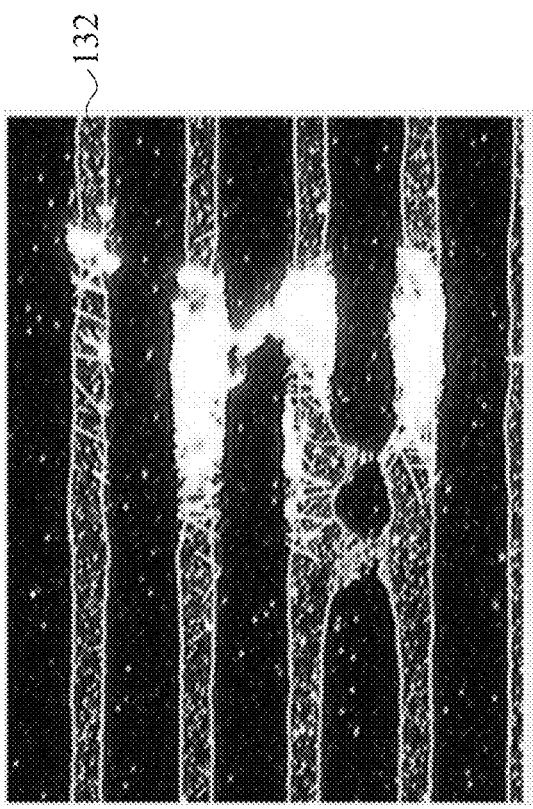
FIGS. 3C and 3D are optical microscope images of the peripheral traces according to some comparative examples.
Figure 3C:
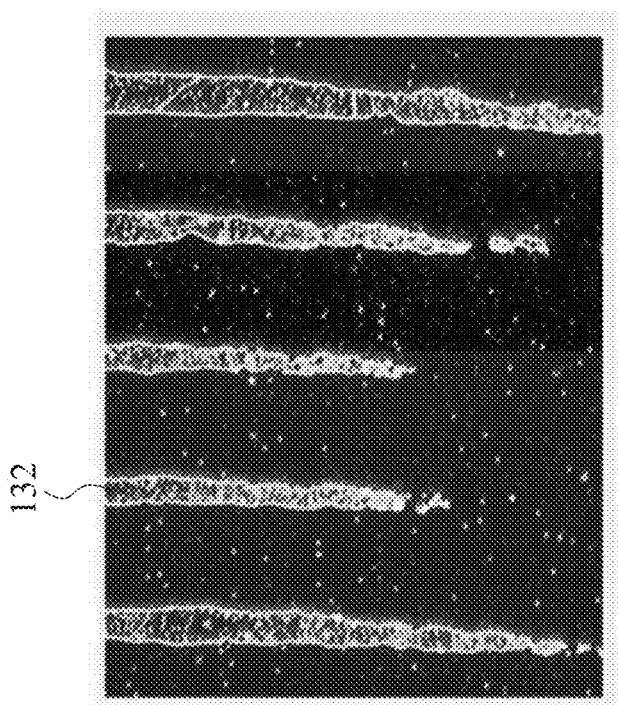

FIGS. 3C and 3D are optical microscope images of the peripheral traces 132 according to some comparative examples. Reference is made to FIGS. 3C and 3D. The comparative examples of FIGS. 3C and 3D are examples attempting to manufacture the peripheral traces 132 with a line width W of about 5 μm and a line spacing D of about 5 μm. It can be seen from FIG. 3C that the peripheral traces 132 are not well and uniformly formed due to over-etching and that there is open circuit. It can be seen from FIG. 3D that the peripheral traces 132 are also not well and uniformly formed due to over-etching and that there is short circuit between two adjacent peripheral traces 132 due to poor etching. Based on the above, in order to make the touch sensor 100 meet the requirements of electrical specifications for the touch sensor 100, a lower limit of the line width W and the line spacing D of the peripheral traces 132 is about 6 μm.

According to the aforementioned embodiments of the present disclosure, the peripheral traces of the touch sensor of the present disclosure include metal nanowires, and a line width and a line spacing of the peripheral traces are each designed to be within a specific numerical range. Moreover, a variety of structures of the peripheral traces with a line width and line spacing within the specific numerical range that can be implemented are provided. As such, the touch sensor can provide a variety of applications that meet the requirements of electrical specifications for the touch sensor and narrow bezel design, thereby meeting the demand of the market. Furthermore, when the peripheral traces of the touch sensor are made of different materials, there will be different limitations due to different materials and the corresponding patterning process conditions. In other words, there is no comparison between the specification of the peripheral traces made of materials different from metal nanowires and the specification of the peripheral traces made of metal nanowires.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch sensor having a visible area and a peripheral area at least on one side of the visible area, comprising:
a substrate;
a touch electrode layer disposed on a surface of the substrate and comprising a plurality of touch electrodes corresponding to the visible area; and
a plurality of peripheral traces disposed on the surface of the substrate, corresponding to the peripheral area, and respectively electrically connected to the touch electrodes, wherein:
each of the peripheral traces comprises a first conductive layer and a second conductive layer disposed in a stack,
the first conductive layer is a metal nanowire layer comprising a matrix and a plurality of metal nanowires distributed in the matrix,
a line width of each of the peripheral traces is more than or equal to 6 μm and less than or equal to 12 μm,
a line spacing of any adjacent peripheral traces of the peripheral traces is more than or equal to 6 μm and less than or equal to 12 μm,
the first conductive layer has a bottom surface facing the substrate, a top surface facing opposite to the bottom surface, and a first sidewall extending between the bottom surface and the top surface,
the first sidewall of the first conductive layer is nonparallel to the bottom surface of the first conductive layer and the top surface of the first conductive layer,
the second conductive layer has a bottom surface facing the substrate, a top surface facing opposite to the bottom surface, a first sidewall extending between the bottom surface and the top surface, and a second sidewall opposite to the first sidewall of the second conductive layer,
the first sidewall of the second conductive layer and the second sidewall of the second conductive layer are nonparallel to the bottom surface of the second conductive layer and the top surface of the second conductive layer,
the first sidewall of the first conductive layer is aligned with the first sidewall of the second conductive layer, and
the second conductive layer is made of a metal material and is opaque from the first sidewall of the second conductive layer to the second sidewall of the second conductive layer.

2. The touch sensor of claim 1, wherein the line width of each of the peripheral traces is less than or equal to 8 μm and the line spacing of any adjacent peripheral traces of the peripheral traces is less than or equal to 8 μm.

3. The touch sensor of claim 1, wherein a ratio of a width of the peripheral area on the one side of the visible area to a width of the visible area is between 0.003 and 0.010.

4. The touch sensor of claim 1, wherein the touch electrode layer is a metal nanowire layer comprising the matrix and the metal nanowires distributed in the matrix.

5. The touch sensor of claim 1, wherein the first conductive layer is between the second conductive layer and the substrate, and the first conductive layer contacts the bottom surface of the second conductive layer.

6. The touch sensor of claim 5, wherein the first conductive layer and the touch electrode layer are on a same horizontal plane.

7. The touch sensor of claim 1, wherein the second conductive layer is between the first conductive layer and the substrate, and the second conductive layer contacts the bottom surface of the first conductive layer.

8. The touch sensor of claim 7, wherein the first conductive layer and the touch electrode layer are on different horizontal planes, and the first conductive layer is connected to one of the touch electrodes corresponding to the first conductive layer by a climbing section.

9. The touch sensor of claim 1, wherein the first conductive layer and one of the touch electrodes connected and corresponding to the first conductive layer are integrally formed as one piece without any interface therebetween.

10. The touch sensor of claim 1, further comprising a film layer covering the peripheral traces.

11. The touch sensor of claim 10, wherein the film layer is filled between the adjacent peripheral traces of the peripheral traces.

12. The touch sensor of claim 11, wherein the first conductive layer and the second conductive layer of each of the peripheral traces are in contact with the film layer.

13. The touch sensor of claim 1, wherein the second conductive layer is a single-layer structure made of a single metal material or an alloy material, or a bilayer or multilayer structure made of two or more metal materials or alloy materials.

14. The touch sensor of claim 1, further comprising a film layer covering the peripheral traces, wherein at least some of the metal nanowires are at least partially embedded in the film layer.

15. The touch sensor of claim 1, wherein each of the peripheral traces is electrically connected to no more than one other peripheral trace.

16. The touch sensor of claim 1, wherein a second sidewall of the first conductive layer is aligned with the second sidewall of the second conductive layer.

17. The touch sensor of claim 1, wherein the first sidewall of the first conductive layer is perpendicular to the bottom surface of the first conductive layer and the top surface of the first conductive layer.

18. The touch sensor of claim 1, wherein the first sidewall of the second conductive layer and the second sidewall of the second conductive layer are perpendicular to the bottom surface of the second conductive layer and the top surface of the second conductive layer.

19. The touch sensor of claim 1, further comprising a film layer in contact with the first sidewall of the first conductive layer and the first sidewall of the second conductive layer.

20. The touch sensor of claim 19, wherein the film layer overlies the first conductive layer and the second conductive layer.

* * * * *